March 24, 1964     B. C. HOLBEN     3,126,086
TRANSFER MECHANISM FOR AUTOMATIC ROUTING CONVEYORS
Filed April 20, 1961
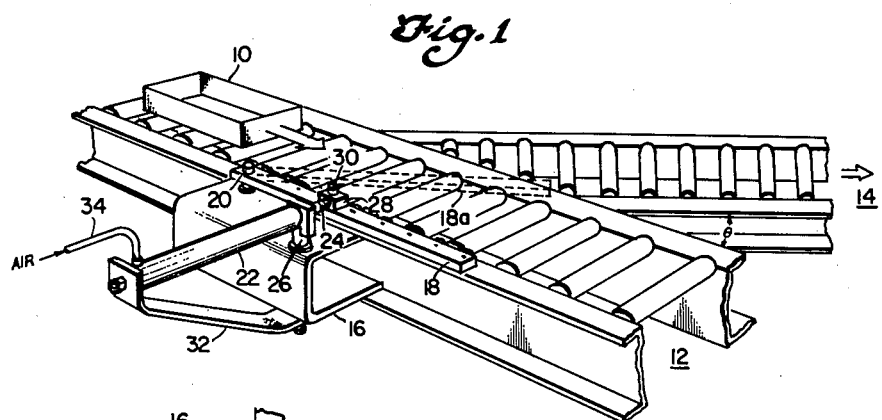
*Fig. 1*
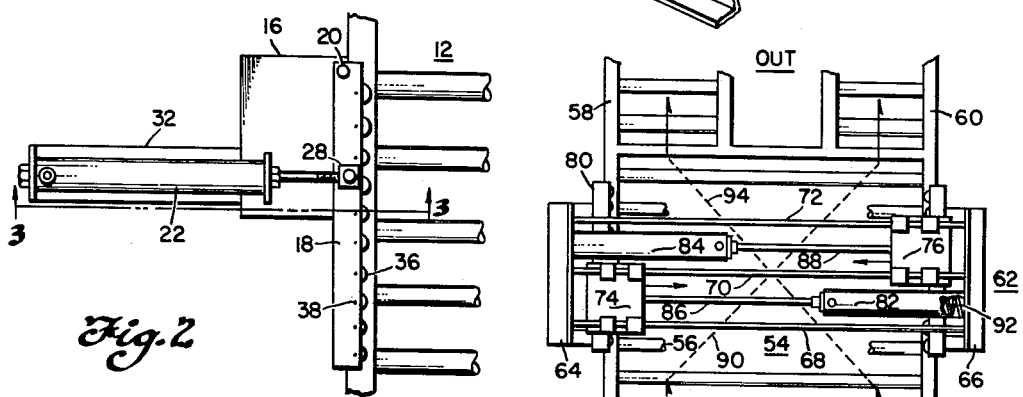
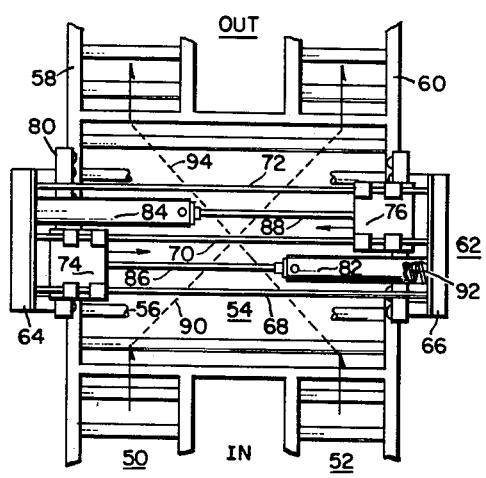
*Fig. 2*
*Fig. 4*
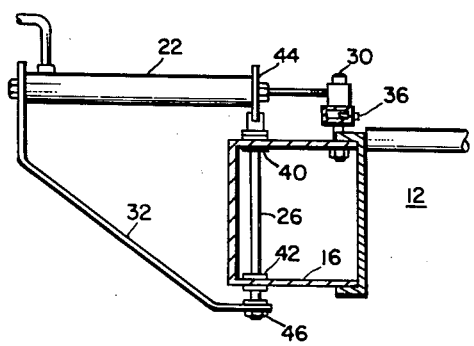
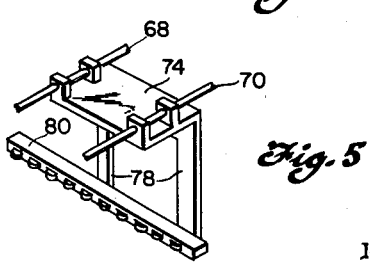
*Fig. 3*
*Fig. 5*
INVENTOR
Bernard C. Holben

United States Patent Office 3,126,086
Patented Mar. 24, 1964

3,126,086
TRANSFER MECHANISM FOR AUTOMATIC
ROUTING CONVEYORS
Bernard C. Holben, Dublin, Ohio, assignor to Industrial
Nucleonics Corporation, a corporation of Ohio
Filed Apr. 20, 1961, Ser. No. 104,455
4 Claims. (Cl. 198—24)

This invention relates generally to conveyor systems and more specifically to improved apparatus for diverting and transferring articles from one conveyor to another.

In conveyor systems, articles traveling on a main conveyor line must frequently be routed onto other intersecting branch conveyors for purposes of sorting or storage. It may be desired to either divert the articles whereby their direction of travel is altered or to transfer articles from one conveyor to another traveling in the same direction. Whatever the operation the actuating member must be positive-acting. Reliability is essential to the successful operation of conveyor systems handling large volumes of traffic. Recently, the trend has been to higher conveyor line speeds approaching 120 feet per minute and a traffic volume approaching thirty or thirty-five units per minute. Slow-acting prior art devices have failed to cope with these high conveyor speeds especially where the traffic density is greater than fifteen units per minute.

The present invention provides an improved material transfer station comprising a pneumatically-operated diverter bar carrying a plurality of aligned roller bearings. The arm is pivoted at one end and pivotally connected at a point intermediate the ends thereof to a piston-and-cylinder driving mechanism. The arm is movable from a first position out of the path of trays traveling on the main conveyor to a second position wherein the roller bearings define an alternate path for the tray with the intersecting branch conveyor.

Accordingly, it is a primary object of the present invention to provide an improved material transfer station for rapid conveyor systems.

It is another object of the present invention to provide a material transfer station that is quick and reliable in operation.

It is still another object of the present invention to provide a material transfer station that is readily adaptable to existing conveyor systems.

It is yet another object of the present invention to provide a material transfer station that is simpler to construct and more economical to maintain in operating condition than similar devices used heretofore.

These and other objects and advantages of the present invention will become more apparent from the following description when taken in conjunction with the present invention:

FIG. 1 is a perspective view of a portion of a conveyor system showing a material transfer station constructed in accordance with the present invention;

FIG. 2 is a partial top plan view of the transfer station shown in FIG. 1;

FIG. 3 is a sectional view taken on the line 3—3 of FIG. 2;

FIG. 4 is a top plan view of another transfer station comprising an alternate embodiment of the present invention; and FIG. 5 is an isometric view of a portion of the transfer station shown in FIG. 4.

Referring to the drawings and specifically to FIG. 1, a main conveyor 12 is adjoined by a branch conveyor 14 intersecting at some angle θ. At the intersection is provided a U-shaped mounting bracket 16 welded to one side of the main conveyor 12. A diverter bar 18 is pivotally mounted at one end by a pin 20 extending downwardly through the mounting bracket 16 and secured thereto.

An air cylinder 22 and piston rod 24 provide the driving force required to move the diverter bar 18 into the dotted line position 18a. One end of the cylinder is pivotally mounted on the bracket 16 by a pin 26 to accommodate the rotary movement of the bar 18. The piston rod 24 is threaded at one end to receive a block 28. The block is fastened onto the diverter bar 18 by a capscrew 30. The air cylinder is secured at the other end by a bracket 32 which also pivots about the pin 26 as hereinafter explained. A conduit 34 admits air under pressure to the interior of the cylinder 22 thereby producing an outward thrust on the bar 18.

The construction of the bar 18 carries a plurality of roller bearings 36 in horizontal alignment. A vertical pin 38 rotatably mounts each roller bearing 36 to the bar 18. In this manner, when the bar 18 is swung out, the thrust of the piston is exerted over a substantially large area distributed over the length of a tray 10. Moreover, the force is exerted against the side of the tray in the desired direction of travel.

As the bar 18 is forced outward, the longitudinal axis of the cylinder 22 can no longer remain perpendicular to the conveyor 12. Referring to FIG. 3, means for pivoting the cylinder assembly for rotation is shown. The pivot pin 26 extends through bearings 40, 42 provided in the mounting bracket 16. The pin 26 is slotted to receive a cylinder mounting bracket 44 which may be welded. Pin 26 is provided with shouldered upper and lower end portions. The lower portion is threaded to receive the cylinder supporting bracket 32 and a retaining nut 46.

Frequently, it is desired to transfer trays from one conveyor to another, both of which are traveling in the same direction. Two entrance conveyors may converge into one exit conveyor or one entrance conveyor may branch into two exit conveyors. It is the purpose of the following embodiment of the present invention to effect a smooth efficient transfer of trays without substantially altering the feed forward velocity of the same.

With reference now to FIGS. 4 and 5, a left-hand entrance conveyor 50 and a right-hand entrance conveyor 52 terminates in a wide roll section 54 having a plurality of belt-driven rollers 56. Some of the rollers have not been shown to simplify the illustration. Left and right-hand exit conveyors 58, 60 adjoin the downstream side of the wide roll section 54. Arrows indicate the direction of movement on the various conveyors. An overhead transfer station 62 is provided to alter the path of incoming trays at will.

Specifically, a pair of upstanding stanchions 64, 66 are mounted on opposite sides of the wide roll section 54. Guide rods 68, 70, 72 are carried between the stanchions 64, 66. A pair of carriages 74, 76 are slidably mounted on the guides and carry downwardly depending structure for supporting a bar 80 of roller bearings. A pair of air cylinders 83, 84 and piston rods 86, 88 are mounted between the stanchions 62, 64 and the carriages 74, 76. The cylinders may be connected to a source of air through individual selectively energizable valve means (not shown).

In the operation of the present invention, assume a tray enters the transfer station on conveyor 50 and that it must be transferred to conveyor 60. Air is admitted into cylinder 82 by manual or automatic control expedients which are beyond the scope of this invention and the piston rod 86 retracts carrying the carriage 74 and bar 80 from left to right. The combination of the forward motion of the tray supplied by the conveyor rollers and the lateral movement imposed by the transfer apparatus produces a resultant motion of the tray as indicated by the dotted line 90. When the piston rod reaches the limit of its travel, air pressure is removed and a spring 92 returns the carriage back to its original position. It may be desirable to increase the cushion of the piston stop to insure that the bar 18 remains displaced long enough to enable the tray 10 to engage the branch conveyor 14. Similarly, actuation of the carriage 76 will effect a transfer from conveyor 52 to conveyor 58 as indicated by the dotted line 94. It may be desirable to provide an interlocking control on the two cylinders so that both cannot be energized at the same time. It may also be observed that the transfer station 62 does not interfere with traffic normally flowing straight through.

While the present invention has been described in terms of specific apparatus, this construction should be in no way interpreted as limiting the invention. Inasmuch as numerous additions, omissions and substitutions may be made to the illustrated embodiments without detracting from the original spirit or scope of the invention, the only restrictions are those clearly imposed by the following claims.

I claim:
1. An article transfer station comprising:
two parallel coplanar conveyors bearing articles to be transferred from either conveyor to the other,
a wide-roll section bridging said conveyors,
a deflector bar positioned along the outside of each of said conveyors at opposite sides of said wide-roll section and extending in the direction of travel of said articles,
separate linear drive means for moving each of said bars across said wide-roll section, and
means for selectively energizing one or the other of said drive means to move said associated deflector bar from a first position along the outside of one of said conveyors to a second position defining a path for said article with the outside of said other conveyor.
2. The combination set forth in claim 1 in which each of said deflector arms comprises:
a longitudinal member,
a plurality of roller bearings, and
means for rotatably mounting said roller bearings in alignment on said longitudinal member.
3. An article transfer station comprising:
two parallel coplanar conveyors bearing articles to be transferred from either conveyor to the other,
a wide-roll section bridging said conveyors,
a pair of upstanding stanchions mounted on the outside of said wide-roll section,
horizontal guide rods mounted between said stanchions above said wide-roll section,
a pair of movable carriages,
means for slidably mounting each of said carriages on different pairs of said guide rods,
an air cylinder and piston assembly connected between each of said stanchions and said carriages and mounted for opposing operation,
a pair of deflecting bars,
downwardly depending members connected to each of said carriages,
means for mounting one of said deflecting bars on each of said downwardly depending members, and
energizing means for selectively actuating one of said cylinder and piston assemblies to move said associated carriage from one side of said wide-roll section to the other.
4. The combination set forth in claim 3 in which each of said deflecting bars comprises:
a longitudinal member,
a plurality of roller bearings, and
means for rotatably mounting said roller bearings in alignment on said member.

References Cited in the file of this patent

UNITED STATES PATENTS

| | | |
|---|---|---|
| 2,451,104 | Lowe | Oct. 12, 1948 |
| 2,531,292 | Page | Nov. 21, 1950 |
| 2,881,898 | Reilly | Apr. 14, 1959 |
| 2,966,251 | Nussbaum | Dec. 27, 1960 |
| 3,006,457 | Weiss | Oct. 31, 1961 |
| 3,045,801 | Graybeal | July 24, 1962 |